United States Patent [19]

Biale

[11] Patent Number: 5,053,441
[45] Date of Patent: Oct. 1, 1991

[54] CORE/SHELL PARTICLES AND PROCESS FOR MAKING SAME

[75] Inventor: John Biale, Anaheim, Calif.

[73] Assignee: Union Oil Company of California, Los Angeles, Calif.

[21] Appl. No.: 646,447

[22] Filed: Jan. 25, 1991

Related U.S. Application Data

[63] Continuation of Ser. No. 248,404, Sep. 23, 1988, abandoned.

[51] Int. Cl.$^5$ .................. C08F 257/02; C08F 279/02; C09D 151/06
[52] U.S. Cl. .................................. 523/201; 524/458; 525/309; 525/310; 525/902; 428/407
[58] Field of Search ............... 523/201; 524/458; 525/309, 310, 902; 428/407

[56] References Cited

U.S. PATENT DOCUMENTS

| | | | |
|---|---|---|---|
| 3,177,173 | 4/1965 | Filter et al. | 260/29.7 |
| 3,254,044 | 5/1966 | Gunderman et al. | 260/29.6 |
| 3,324,066 | 6/1967 | Arcangeli et al. | 260/29.7 |
| 3,397,165 | 8/1968 | Goodman et al. | 260/29.7 |
| 3,423,351 | 1/1969 | Pierce et al. | 260/29.6 |
| 3,426,101 | 2/1969 | Ryan et al. | 260/876 |
| 3,657,172 | 4/1972 | Gallagher et al. | 260/29.6 RB |
| 3,914,338 | 10/1975 | Kreig | 525/902 |
| 4,002,801 | 1/1977 | Knechtges et al. | 428/474 |
| 4,226,752 | 10/1980 | Erickson et al. | 260/29.6 RB |
| 4,391,928 | 7/1983 | Herman et al. | 523/201 |
| 4,427,836 | 1/1984 | Kowalski et al. | 525/301 |
| 4,460,742 | 7/1984 | Kishida | 525/85 |
| 4,468,498 | 8/1984 | Kowalski et al. | 525/301 |
| 4,469,825 | 9/1984 | Kowalski et al. | 523/201 |
| 4,497,917 | 2/1985 | Upson | 523/201 |
| 4,594,363 | 6/1986 | Blankenship et al. | 521/64 |
| 4,613,633 | 9/1986 | Sekiya | 523/201 |
| 4,631,235 | 12/1986 | Biale | 428/518 |
| 4,677,003 | 6/1987 | Redlich et al. | 427/373 |
| 4,683,269 | 7/1987 | Aksman | 525/258 |
| 4,829,102 | 5/1989 | Biale | 525/902 |

FOREIGN PATENT DOCUMENTS 173789 3/1986 European Pat. Off. ............ 524/458

OTHER PUBLICATIONS

Kasai et al., "Hollow Polymer Particles", *Chemical Abstracts*, (1986), No. 105:153705v, vol. 105, p. 11.
Chalmers, J. R., "Air and Polymer-Extended Paints", European Supplement to Polymers and Paint Colour Journal, Oct. 5, 1983, pp. 94-95, 97-98, 101-102.
*Paint and Surface Coatings: Theory and Practice*, R. Lambourne, Ed., "Air and Polymer Extended Paints (Microvoids and Plastic Pigment", Sec. 9.5, pp. 373-375 (1987).
Ramaiah et al., "Microvoids Organic Coatings", *Progress in Organic Coatings*, 11 (1983), 267-285, Elsevier Sequoia, printed in the Netherlands.
Ramig et al., "Plastic Pigment: A Novel Approach to Microvoid Hiding, Effect of Composition of Latex Paint Performance", paper presented at the J. Oil Col. Chem. Assoc. held in Bath, 17-20, Jun. 1981, J. Oil Col. Chem. Assoc., 1981, 64, 439-447.
Spalding, B. J., "Encapsulated Pigment for Latex Paint", *Chemical Week*, Sept. 3, 1986, p. 45.
Tess et al., *Applied Polymer Science*, 2d Edition, pp. 131-150 (1985).

*Primary Examiner*—John C. Bleutge
*Assistant Examiner*—David Buttner
*Attorney, Agent, or Firm*—Gregory F. Wirzbicki; Shlomo R. Frieman

[57] ABSTRACT

A core/shell polymer is capable of increasing a composition's whiteness of opacity. The shell polymer has either a crystalline structure of a $T_g$ of at least about 50° C. The shell polymer comprises (i) at least one nonionic monomer selected from the group consisting of soft alkyl acrylate monomers, soft methacrylate ester monomers, and mixtures thereof, and (ii) at least one additional nonionic monomer. The core has a different composition than the composition of the shell and a $T_g$ of at least about 50° C. The core comprises alkenyl aromatic monomers. The core and shell polymers are homopolymers or copolymers.

19 Claims, No Drawings

CORE/SHELL PARTICLES AND PROCESS FOR MAKING SAME

This application is a continuation of application Ser. No. 07/248,404, filed Sept. 23, 1988, now abandoned.

BACKGROUND

The present invention relates to polymeric opacifying agents used in the production of paints, paper coatings, and films and, more particularly, to opacifying agents having a core/sheath structure.

The steady increase in the price of titanium dioxide ($TiO_2$) as well as the steady decrease in its availability have created a demand for products capable of replacing at least a part of the $TiO_2$ needed to opacify paints and other coating compositions. In $TiO_2$ and other naturally white products, such as snow, a multiplicity of irregular surfaces and/or microvoids randomly scatter light within these products to create the appearance of whiteness. Microvoid-containing polymer particles perform in a similar manner. When incorporated into a paint or paper coating composition, the microvoid-containing polymer particles cause a significant increase in the resulting composition's whiteness or opacity.

Recently, a number of approaches to incorporating microvoid-containing polymer particles into paint and paper coating formulations has been disclosed. (See "Air and Polymer Extended Paints," Chalmers et al., *European Supplement to Polymer Paint Colour Journal*, Oct. 5, 1983, pp. 94–102.) One approach entails the use of solid and/or vesiculated (hollow) polyester/styrene copolymer beads having a size in the range of 3 to 50 microns and marketed under the tradename "Spindrift." These particles are formulated to contain both air and $TiO_2$ within their interior. A major use of these particles has been to formulate matte paints with good polish resistance. However, unpigmented beads act as windows in the film and are generally used only for highly saturated colors. For cost effectiveness, the vesiculated beads have been generally used as a partial replacement for $TiO_2$.

In a second approach, aggregates of fine particles are formed by a process of addition polymerization under conditions of high shear in an aqueous medium. This process produces irregular shaped particles (sold under the name "Microblock"). The irregular shaped particles allegedly produce higher film strengths than produced by spherical beads. Unlike the vesiculated beads, described above, internal pigmentation with $TiO_2$ has not been found to be effective. Accordingly, the irregular shaped particles are usually combined with external $TiO_2$ and a film extender to produce high pigment value content (pvc) paints which are very flat.

In a third approach, fine particle size, non-film-forming, polystyrene hollow beads are used. These beads have a particle size in the range of the same order of magnitude as that of latex particles normally used in emulsion paints, namely 100 to 600 nm. Typically, the beads are blended with the latex particles in a 1:1 by weight ratio. These particles are sold under the tradename of "Plastic Pigment."

A fourth approach involves a suspension of non-film-forming hollow styrene/acrylic copolymer beads (typically 38% by weight, 52% by volume). The processes for manufacturing these microvoid particles are described in U.S. Pat. No. 4,427,836 (Kowalski et al. I), U.S. Pat. No. 4,469,825 (Kowalski et al. II) and U.S. Pat. No. 4,594,363 (Blankenship et al.). Kowalski et al. I and Blankenship et al. disclose the production and use of water insoluble particles made by sequential emulsion polymerization to form a swellable "core" of polymeric acid. The core is then at least partially encased with a "sheath" or "shell" polymer permeable to a volatile base such as ammonia or an organic amine. Sheath permeability is necessary to allow the base to contact the core. Kowalski et al. II differs from Kowalski et al. I and Blankenship et al. in that in Kowalski et al. II the core comprises a polymeric base and the sheath polymer is permeable to an acid, e.g., acetic acid. When any of these particles are neutralized, the core swells and causes the entire particle to swell up. When a paint film containing these particles dries, water is lost from the beads' interior voids and replaced by air. The resulting empty "microvoids" act as light scattering sources, thus increasing the hiding power of the dried film. In addition to opacifying by scattering incident light, it has been postulated that these particles also contribute to hiding power by uniformly spacing $TiO_2$ particles and, thus, help prevent $TiO_2$ clumping. Accordingly, these particles supplement or replace a part of the pigmentary medium or extenders that would otherwise be required to achieve equivalent hiding power. For example, literature articles concerning these products indicate that these particles can replace up to about 25% of the $TiO_2$ content in a paint formulation. In particular, four parts by volume of these opaque polymers are approximately equal in hiding power to one part by volume of $TiO_2$.

SUMMARY OF THE INVENTION

In the present invention, a high degree of hiding power is achieved with a core/shell polymeric structure which requires neither swelling nor the presence of discrete microvoids.

The core/shell polymer of the present invention comprises a non-swellable core polymer having an outer surface and a shell polymer in physical contact with and covering at least a part of the outer surface of the core polymer. The shell polymer has a different composition from that of the core polymer. The core polymer comprises alkenyl aromatic monomers and has a $T_g$ of at least about 50° C. The core and shell polymers are either homopolymers or copolymers. For example, the core polymer can be a copolymer of alkenyl aromatic monomers and open-chain aliphatic conjugated diene monomers. The shell polymer has either a crystalline structure or a $T_g$ of at least about 50° C. However, the shell polymer must comprise some soft alkyl acrylate or methacrylate ester monomer in order to avoid forming substantial amounts of coagulum or grit during the polymerization of the shell polymer. The core/shell polymer is usually formed by (a) polymerizing one or more monomers to form the non-swellable core polymer particle and (b) encapsulating the core polymer particle with a polymerized shell polymer.

The instant invention also encompasses (a) an emulsion comprising a liquid and the core/shell polymer, (b) a formulation comprising a binder and the core/shell polymer; (c) a composition formed by drying the formulation, and (d) a coated substrate formed by the steps of (i) applying a layer of the formulation to a substrate and (ii) allowing the formulation to dry on the substrate.

DETAILED DESCRIPTION OF THE INVENTION

The present invention is directed to (a) a core/shell polymer, (b) a process for making the core/shell polymer, (c) an emulsion comprising a liquid and the core/shell polymer, (d) a formulation comprising a binder and the core/shell polymer, (e) a composition formed by drying the formulation, and (f) a coated substrate formed by the steps of (i) applying a layer of the formulation to a substrate and (ii) allowing the formulation to dry on the substrate. The core/shell polymers of the instant invention cause a significant increase in the whiteness or opacity of compositions that contain them.

In accordance with the present invention, the core/shell polymer comprises a non-swellable core polymer having an outer surface and a shell polymer in physical contact with and covering at least a part of the outer surface of the core polymer. The shell polymer has a different composition from that of the core polymer because the core/shell polymer's opacity is due, in part, to the difference between the index of refraction of the core polymer and index of refraction of the shell polymer. The greater the difference in the indices of refraction, the greater the opacity of the core/shell polymer. Because opacity is partially due to the difference in indices of refraction, it is preferred that the shell polymer substantially encapsulate the core polymer. In addition, since opacity is enhanced by the presence of discrete core/shell polymers, it is preferred that the shell polymer be either crystalline or have a glass transition temperature ($T_g$) of at least about 50° C. For the same reason, it is preferred that the core polymer have a $T_g$ of at least about 50° C. Generally, the shell polymer is non-crystalline and the core and shell polymers each have a $T_g$ of at least about 60° C. Typically, the $T_g$ range of the core and shell polymers is about 60° to about 105° C.

The core polymer comprises a backbone and a pendant group comprising an aromatic ring. More particularly, the core polymer comprises one or more alkenyl aromatic monomers defined herein as any organic compound containing at least one aromatic ring and at least one aliphatic-containing moiety having alkenyl unsaturation. Preferred alkenyl aromatic monomers can be represented by the formula

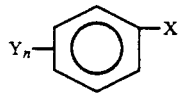

wherein X is an aliphatic radical containing at least one alkenyl bond, Y is a substituent on the aromatic ring, and n is the number of Y substituents on the ring, n being an integer from 0 to 5. Generally, X comprises at least 2 carbon atoms, but usually no more than about 6, and preferably no more than about 3 carbon atoms. X is preferably a substituted or unsubstituted alkenyl group. Preferred alkenyl group substituents are halogen radicals, e.g., chloride. However, the most preferred alkenyl group is unsubstituted, i.e., a hydrocarbon, and contains only one olefinic unsaturation. Ethylene is the most preferred X.

Y is an organic or inorganic radical. As used herein, the term "organic radical" means any group containing at least one carbon atom, and the term "inorganic radical" means any group devoid of even one carbon atom. When n is 2 or more, Y can be the same or different. If organic, Y generally contains from 1 to about 15 carbon atoms and, preferably, is an aliphatic radical. Even more preferably, it is a saturated aliphatic radical. If inorganic, Y is preferably a halogen. Exemplary substituents for Y include halo and cyano radicals and substituted and unsubstituted alkyl radicals of 1 to about 10 carbon atoms. Preferred Y substituents are chloride and unsubstituted alkyl groups of 1 to about 6 carbon atoms. Y is most preferably chloride radicals and $C_1$ to about $C_4$ unsubstituted alkyl radicals.

Illustrative alkenyl aromatic monomers include styrene, p-methyl styrene, methyl styrene, o,p-dimethyl styrene, o,p-diethyl styrene, p-chlorostyrene, isopropyl styrene, t-butyl styrene, o-methyl-p-isopropyl styrene, and o,p-dichlorostyrene. Due to its commercial availability and low cost, styrene is the preferred alkenyl aromatic monomer.

The core polymer can be either a homopolymer or a copolymer. The copolymers can comprise two or more different alkenyl aromatic monomers. In addition, the copolymers can comprise one or more monomers that are not alkenyl aromatic monomers. For example, the core polymer can also comprise one or more ethylenically unsaturated comonomers. These ethylenically unsaturated comonomers preferably have one olefinic group, are free of alkynyl and $—C{=}N—$ linkages, and have no more than one other functionality selected from the group consisting of carboxylic, sulfonic, phosphonate, amino, nitrile, epoxide, hydroxyl, amide, and keto groups. To optimize polymerization activity, the comonomers more preferably have either none of these functionalities or only one carboxylate group of the formula

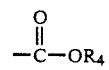

wherein $R_4$ is selected from the group consisting of hydrogen, nitro, amino, nitrile, and hydroxyl groups, organic radicals, hydrogen, and halogen. As used herein, the term "organic radical" refers to any radical containing at least one carbon atom. These radicals can be cyclic or acyclic, have straight or branched chains, and can contain one or more heteroatoms such as sulfur, nitrogen, oxygen, and phosphorus. Furthermore, the organic radicals can be substituted with one or more substituents such as thio, hydroxy, nitro, amino, nitrile, and halogen radicals or groups. In addition, the organic radicals can contain aryl groups, such as aralkyl and alkylaryl groups. Preferred polymerization rates are obtained when the organic radicals are substituted or unsubstituted aliphatic radicals. Exemplary saturated aliphatic radicals include straight and branched chain alkyl groups, cycloalkyl groups, alkyl substituted cycloalkyl groups, and cycloalkyl substituted alkyl groups. Generally, $R_4$ is hydrogen or unsubstituted alkyl group. Since the ability of unsubstituted alkyl-containing, ethylenically unsaturated monomers to polymerize decreases as $R_4$'s chain length increases, the unsubstituted alkyl group preferably contains no more than about 2 carbon atoms in length. Hydrogen and methyl are the most preferred $R_4$.

Monoethylenically unsaturated acid comonomers are capable of helping to maintain the core's integrity. Typical monoethylenically unsaturated acid comonomers include acrylic acid, methacrylic acid, 2-propylpropionic acid, 2-butylpropionic acid, 2-pentapropionic acid, 2-hexylpropionic acid, cyclohexylacrylic acid, chloroacrylic acid, phenylacrylic acid, furylacrylic acid, 2-butenoic acid, 2-ethylhexyl 2-butionic acid, 2-pentenoic acid, 3-methyl-3-pentenoic acid, acryloxypropionic acid, itaconic acid, maleic acid, fumaric acid, and crotonic acid. Acrylic acid, methacrylic acid, and itaconic acid are the preferred monoethylenically unsaturated acid comonomer because they tend to uniformly polymerize with alkenyl aromatic monomers and also tend to form latexes that exhibit good stability.

Nonionic comonomers are ethylenically unsaturated monomers that are devoid of reactive or functional groups. Typical nonionic comonomers include alkyl ($C_1$—$C_{20}$) esters of the foregoing monoethylenically unsaturated acid monomers, styrene, vinyl toluene, ethylene, vinyl acetate, vinyl chloride, vinylidene chloride, acrylonitrile, and mixtures thereof.

The core polymer optionally comprises a small concentration of a cross-linkable comonomer. Cross-linkable comonomers include polyethylenically unsaturated monomers. Typical polyethylenically unsaturated monomers include ethylene glycol diacrylate, allyl acrylate, 1,3-butanediol diacrylate, 1,3-butylene diacrylate, diethylene glycol diacrylate, ethylene glycol dimethacrylate, 1,3-butanediol dimethacrylate, 1,3-butylene dimethacrylate, diethylene glycol dimethacrylate, trimethylol propanetriacrylate, divinylbenzene, and open-chain aliphatic conjugated diene comonomers. Due to their low cost, commercial availability, and ability to readily polymerize, open-chain aliphatic conjugated diene monomers are the preferred cross-linkable comonomers.

Exemplary open-chain aliphatic conjugated diene comonomers have the formula

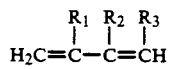

wherein $R_1$, $R_2$, and $R_3$ are each independently selected from the group consisting of hydrogen, halo, cyano, and methyl. Typical open-chain aliphatic conjugated diene comonomers include butadiene-1,3, 2-methyl-butadiene-1,3, 2,3,-dimethyl-butadiene-1,3, piperylene, 2-chlorobutadiene-1,3, and 2-cyanobutadiene-1,3. Butadiene-1,3 is the preferred open-chain aliphatic conjugated diene comonomer because it is the most commercially available open-chain aliphatic conjugated diene monomer.

The alkenyl aromatic monomers and any optional comonomers are present in the core polymer in a concentration such that the core polymer maintains a $T_g$ of at least about 50° C. To achieve this end, the core polymer generally comprises at least about 50 weight percent alkenyl aromatic monomer based on the total weight of the core polymer. The concentration range of the various comonomers varies and depends on the function performed by the comonomer in the core polymer as well as upon the comonomer's $T_g$. For example, the concentration of a cross-linkable comonomer in the core polymer is generally less than about 30 weight percent. Typically, these comonomers are present in a range of about 0.01 to about 20 weight percent. In particular, a preferred styrene butadiene containing core polymer comprises up to about 20 weight percent butadiene and at least about 80 weight percent styrene.

The core polymer is non-swellable. As used herein, the term "non-swellable" means that the core polymer swells less than about 10 percent by volume when the core polymer is contacted with an acid or a base.

With respect to the shell polymer, the shell polymer must comprise some soft alkyl acrylate and/or methacrylate ester monomers in addition to at least one other of the above-mentioned nonionic monomers. As used herein, the term "soft alkyl acrylate and/or methacrylate ester" means alkyl acrylate and/or methacrylate ester monomers that are capable of forming homopolymers having a $T_g$ of about −20° to about −60° C. The alkyl portion of the alkyl acrylate ester monomer typically has between 1 to about 8 carbon atoms, and preferably from about 2 to about 6 carbon atoms. The alkyl portion of the alkyl methacrylate ester monomers normally contains about 6 to about 10 carbon atoms, and preferably from about 8 to about 10 carbon atoms. Butyl acrylate is the preferred alkyl acrylate ester monomer because of its good polymerization reactivity. Typical alkyl methacrylate ester monomers include octylmethacrylate and decylmethacrylate.

Alternatively worded, the shell polymer comprises a backbone, a first pendant group, and a second pendant group. The first pendant group has the formula

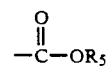

wherein $R_5$ is an alkyl group that comprises from 1 to about 8 carbon atoms when the first pendant group is attached to the backbone at a secondary carbon atom, i.e.,

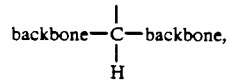

and from about 6 to about 10 carbon atoms when the first pendant group is attached to the backbone at a tertiary carbon atom, i.e.,

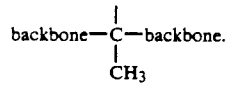

The second pendant group is selected from the group consisting of nonionic organic radicals, e.g., phenyl, and nonionic inorganic radicals, e.g., halogen radicals.

The presence of soft alkyl acrylate and/or methacrylate ester monomers in the shell polymer is essential in order to avoid forming substantial amounts of coagulum or grit during the polymerization of the shell polymer. The shell polymer comprises up to about 10 weight percent of the soft alkyl acrylate and/or methacrylate monomers. Preferably, the shell polymer comprises between about 4 to about 7 weight percent soft alkyl acrylate and/or methacrylate ester monomers. Below about 4 weight percent the grit formed during the shell polymerization step tends to be too high and above about 7 weight percent the opacity of the core/shell polymer tends to decrease.

With respect to the other nonionic monomers in the shell polymer, these nonionic monomers are typically methyl methacrylate (MMA), styrene, isobornyl methacrylate, t-butylmethacrylate, vinyl chloride, and mixtures thereof. Because MMA tends to promote a faster rate of polymerization relative to other nonionic monomers, the shell polymer preferably also comprises MMA. An examplary shell polymer comprises up to about 95 weight percent MMA based on the total weight of the monomers that comprise the shell polymer and up to about 95 weight percent styrene. Isobornyl methacrylate and t-butyl methacrylate can replace a portion of the MMA provided that the shell polymer has a $T_g$ of at least about 50° C.

In general, the core/shell polymer has an average particle size of about 200 to about 1000 nm. Typically, the average particle size of the core/shell polymer ranges from about 300 to about 600 nm. The core polymer usually has an average particle size of about 100 to about 300 nm. A preferred core polymer average particle size is about 150 to about 250 nm.

The core/shell polymer of the instant invention is made by a polymerization process. The process generally comprises emulsion polymerizing a plurality of monomers to form core polymer particles and encapsulating the core polymer particles with an emulsion polymerized shell polymer. Preferably, the core and shell polymers are made by an aqueous emulsion process. An exemplary process for making alkenyl aromatic monomer-containing polymers is disclosed in U.S. Pat. Nos. 3,177,173 and 3,324,066, which patents are incorporated herein by reference. The core polymer can be made by a single- or multi-stage process.

As is common in aqueous emulsion polymerizations, a water soluble, free radical initiator can be used alone or in combination with a reducing agent to form a redox system. The redox system enables the polymerization process to be conducted at lower temperatures. Exemplary free radical initiators include hydrogen peroxide, tertbutyl peroxide, and alkaline metal (e.g., sodium, potassium, and lithium) and ammonium persulfate. Exemplary reducing agents include sulfite, more specifically alkali metabisulfite, hydrosulfite, hyposulfite, and sodium formaldehyde sulfoxylate. Normally, the initiator and reducing agent are each used in an amount of about 0.01 to about 2 percent by weight of the monomer charge. The temperature of the aqueous emulsion usually ranges from about 10° to about 100° C. In general, the lower the reaction temperature, the higher the resulting polymer's molecular weight. When a persulfate system is used, the emulsion temperature typically is between about 60° to about 90° C.

The weight-average molecular weight of alkenyl aromatic-containing core polymers generally exceeds 500,000. A chain transfer agent can be used to control the molecular weight of the alkenyl aromatic-containing core polymers. This is true especially in reaction systems that contain a cross-linkable monomer. Exemplary chain transfer agents include lower alkyl mercaptans, such as sec-butyl mercaptan and monothiolglycerol. The normal concentration of chain transfer agents employed is in a range of about 0.1 to about 2 weight percent of the added monomer. Typically, the chain transfer agent is used in an amount of about 0.05 to about 1 weight percent. Alternatively, higher reaction temperatures, in the range of about 90° to about 100° C., can be used to keep the molecular weight down.

After the core polymer particles are formed, the core polymer particles are then encapsulated with the shell polymer. The encapsulation procedure is preferably conducted by adding an aqueous suspension of one or more of the shell monomers along with a small amount of initiator to the core latex and continuing the emulsion polymerization reaction. The shell polymerization reaction can be performed in the same reaction vessel in which the core polymer was formed. The shell polymer is formed by applying one or more layers, each layer having the same or different monomeric composition. As noted above, opacity is partially due to the difference between the indices of refraction of adjacent polymer layers that constitute the core/shell polymer. Accordingly, it is preferred that the shell polymer be formed by applying a plurality of layers that have different monomeric compositions so that adjacent layers possess different indices of refraction. As the number of layers increases, the difference in the indices of refraction between adjacent layers necessary to obtain satisfactory opacity can decrease. Regardless of whether the shell comprises only one layer or a plurality of layers, the final product is a colloid suspension or emulsion of the core/shell polymer particles.

The emulsion of the finished particles can comprise over 50 percent of the finished core/shell polymer particles without exceeding acceptable levels of coagulum and grit. This is a significant advantage of the present invention in that certain prior opaque polymers are only commercially available at an emulsion concentration of about 40 weight percent. The ability to manufacture opaque polymers and achieve high particle concentrations in the resulting emulsion is important since it reduces the amount of water ultimately shipped with the product and enables a manufacturer to more readily formulate the final composition because other ingredients need not be reformulated due to excessive water in the opaque polymer emulsion.

When the opaque polymers of the present invention are mixed with a suitable latex binder in a concentration of between about 5 to about 15 weight percent of the latex binder, the core/shell polymer dispersions or emulsions of the present invention produce compositions of particular usefulness in opacifying latex paint and paper coating formulations. These opaque polymers can supplement or replace pigmentary matter, such as titanium dioxide and/or titanium dioxide extenders. For example, the core/shell polymers of the present invention can typically replace up to about 35 weight percent of the titanium dioxide used in paints and other coating compositions. The finished emulsions of the core/shell polymer particles of the present invention can be used directly in such formulations. Alternatively, these emulsions can be dried to produce a free flowing powder that can be packaged, stored, sold, and shipped before use.

EXAMPLES

The manufacture of several core/shell polymers within the scope of the present invention is demonstrated in the following examples. In addition, the opacity of a formulation containing titanium dioxide is compared to the opacity of a formulation having a portion of its titanium dioxide content replaced by an exemplary core/shell polymer within the scope of the present invention.

EXAMPLE 1

Manufacture of Core/Shell Polymer

Water (about 2560 gm) was heated in a reactor to about 180° F. under a nitrogen purge. A catalyst (sodium persulfate, about 4.4 gm) and a core polymer (90/10 styrene/butadiene copolymer, 184.8 gm, 50 percent by weight total solids) were then added to the heated water. Next, a mixture containing about 1989 gm methyl methacrylate (MMA), about 530.4 gm styrene, and about 133 gm butyl acrylate (BA) was added over a period of about 3 hours to the reactor which was maintained at a temperature of about 185° F. When the resulting emulsion cooled, 6 gm of NH4OH in 80 ml of water were added. The final emulsion contained about 50.9 weight percent total solids, had a viscosity of about 25 centipoise (cps), contained about 277 ppm grit on a 250 mesh screen, had a core/shell particle size of about 322 nm, and a pH of about 9.9.

EXAMPLE 2

Manufacture of Core/Shell Polymer

A core/shell polymer was manufactured according to the procedure of Example 1, supra. The only substantial change was that the amount of core polymer employed in the preceding example was reduced to about 92.4 gm. The final product contained about 49.0 weight percent total solids, had a viscosity of about 20 cps, a grit content of about 260 ppm on a 250 mesh screen, had a core/shell particle size of about 480 nm, and a pH of about 9.8.

EXAMPLE 3

Pilot Scale Run

MMA (about 46 pounds), styrene (about 12.3 pounds), and BA (about 3.1 pounds) were mixed. Water (about 24,000 gm) and a core polymer (90/10 styrene/butadiene, about 3,200 gm, 50 percent by weight total solids) were added to a reactor. While stirring the reactor's contents at about 60 rpm, the reactor was purged with nitrogen and then heated to about 180° F. A first catalyst solution comprising water (about 1000 gm) and sodium persulfate (about 42 gm) was prepared. A second catalyst solution comprising water (about 1260 gm), Dowfax 2AI brand anionic surfactant (154 gm, Dowfax 2AI is manufactured by Dow Chemical Co., Midland, Michigan), and sodium persulfate (about 42 gm) was also prepared. While stirring at about 120 rpm, and maintaining the temperature of the reactor at about 180° F., the first catalyst solution was added to the reactor. The mixture of MMA, styrene, and BA monomers and the second catalyst solution were then added to the reactor over a period of about 3 hours. The reaction mixture was cooked for about 45 minutes at about 185° F. and then cooled. The final emulsion had a total solids content of about 50.6 weight percent, a viscosity of about 25 cps, a grit content of about 53 ppm on a 250 mesh screen, a core/shell particle size of about 377 nm, and a pH of about 4.1.

EXAMPLE 4

Comparative Opacity Experiment

Coating formulations having the ingredients set for in Table I, infra, were prepared. Each formulation contained 59 percent total solids. A sample of each formulation was coated onto a paper substrate and allowed to dry. The opacity of each dried coating was then measured with a Color Quest TM brand spectrocolorimeter manufactured by Hunter Lab, Reston, Va. The data obtained from this experiment are also set forth in Table I.

TABLE I

|  | Control | Test |
| --- | --- | --- |
| Formulation, pbw[1] | | |
| #2 Clay | 18.2 | 18.2 |
| Delaminated Clay | 72.8 | 72.8 |
| TiO2 | 9.0 | 6.0 |
| Core/Shell Polymer[2] | — | 3.0 |
| Binder | 10.0 | 10.0 |
| Starch | 6.0 | 6.9 |
| Opacity | 91.4 | 90.5 |

[1] The term "pbw" denotes parts by weight.
[2] The core/shell polymer employed was the core/shell polymer manufactured in Example 1, supra.

The comparative experiment of Example 4 demonstrates that 33 parts by weight of TiO$_2$ can be replaced by an exemplary core/shell polymer of the instant invention without substantially detracting from the opacity of the resulting coating.

Although the present invention has been described in considerable detail with reference to certain preferred versions thereof, other versions are possible. For example, a paint or paper coating composition can contain a mixture of the core/shell polymers of the present invention. Therefore, the spirit and scope of the appended claims should not necessarily be limited to the description of preferred versions contained therein.

What is claimed is:

1. An opaque core/shell polymer comprising:
   (a) a non-swellable core polymer having an outer surface, a $T_g$ of at least about 50° C., and an average particle size of about 100 to about 300 nm, and comprising one or more alkenyl aromatic monomers; and
   (b) a shell polymer in physical contact with and covering at least a part of the outer surface of the core polymer, the shell polymer having a composition that is different from the composition of the core polymer and either a $T_g$ of at least about 50° C. or a crystalline structure, wherein the shell polymer comprises methyl methacrylate and about 4 to about 7 weight percent butyl acrylate and the opaque core/shell polymer has an average particle size of about 200 to about 1,000 nm.

2. An emulsion comprising:
   (a) a liquid; and
   (b) the opaque core/shell polymer of claim 1.

3. The core/shell polymer of claim 1 wherein the core polymer further comprises at least one ethylenically unsaturated comonomer.

4. The core/shell polymer of claim 1 wherein the alkenyl aromatic monomer is selected from the group consisting of styrene, p-methyl styrene, methyl styrene, o,p-dimethyl styrene, o,p-diethyl styrene, p-chlorostyrene, isopropyl styrene, t-butyl styrene, o-methyl-p-isopropyl styrene, and o,p-dichlorostyrene.

5. The core/shell polymer of claim 4 wherein the alkeynyl aromatic monomers are styrene.

6. The core/shell polymer of claim 1 wherein the core polymer further comprises a conjugated diene monomer having the formula

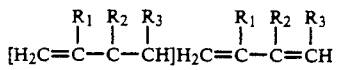

wherein
- $R_1$ is selected from the group consisting of hydrogen, halo, cyano, and methyl;
- $R_2$ is selected from the group consisting of hydrogen, halo, cyano, and methyl; and
- $R_3$ is selected from the group consisting of hydrogen, halo, cyano, and methyl.

7. The core/shell polymer of claim 6 wherein the open-chain aliphatic conjugated diene monomer is butadiene-1,3.

8. The core/shell polymer of claim 7 wherein the core polymer comprises up to about 20 weight percent butadiene and at least about 80 weight percent styrene.

9. The core/shell polymer of claim 1 being substantially devoid or microvoids.

10. The core/shell polymer of claim 1 wherein the shell constitutes a greater weight percent of the core/shell polymer than the weight percent of the core.

11. The core/shell polymer of claim 1 being substantially devoid of microvoids and wherein the shell constitutes a greater weight percent of the core/shell polymer than the weight percent of the core.

12. The core/shell polymer of claim 11 wherein the shell polymer has a $T_g$ greater than 60° C.

13. The core/shell polymer of claim 11 wherein the core polymer has an average particle size of about 150 to about 250 nm.

14. The core/shell polymer of claim 11 having an average particle size of about 300 to about 600 nm.

15. An opaque polymer formed by the steps of:
   (a) polymerizing a plurality of alkenyl aromatic monomers to form non-swellable core polymer particles having a $T_g$ at least about 50° C. and an average particle size of about 100 to about 300 nm; and
   (b) encapsulating the core polymer particles with a polymerized shell polymer having a different composition from that of the core polymer and either a $T_g$ of at least about 50° C. or a crystalline structure, wherein the monomers employed to form the shell polymer comprise methyl methacrylate and about 4 to about 7 weight percent butyl acrylate, wherein the opaque polymer has an average particle size of about 200 to about 1,000 nm and is substantially devoid of microvoids.

16. The polymer of claim 15 wherein the monomers are emulsion polymerized in step (a) to form the core polymer, and the core polymer particle are encapsulated in step (b) with an emulsion polymerized shell polymer.

17. The opaque polymer of claim 15 wherein the shell constitutes a greater weight percent of the opaque polymer than the weight percent of the core.

18. A process for making an opaque polymer comprising the steps of:
   (a) a polymerizing a plurality of alkenyl aromatic monomers to form non-swelling core polymer particles having a $T_g$ of at least about 50° C. and an average particle size of about 100 to about 300 nm; and
   (b) encapsulating the core polymer particles with a polymerized shell polymer having a different composition from that of the core polymer and either a $T_g$ of at least about 50° C. or a crystalline structure, wherein the monomers employed to form the shell polymer comprise methyl methacrylate and about 4 to about 7 weight percent butyl acrylate, wherein the opaque polymer has an average particle size of about 200 to about 1,000 nm, and is substantially devoid of microvoids.

19. The process of claim 18 wherein the shell constitutes a greater weight percent of the opaque polymer than the weight percent of the core.

* * * * *

UNITED STATES PATENT AND TRADEMARK OFFICE
CERTIFICATE OF CORRECTION

PATENT NO. : 5,053,441

DATED : October 1, 1991

INVENTOR(S) : John Biale

It is certified that error appears in the above-identified patent and that said Letters Patent is hereby corrected as shown below:

Column 10,
Claim 5, line 64, replace "4" with -- 1 --.

Column 11,
Claim 6, lines 1 and 2, delete "[$H_2 \overset{R_1}{C^1} = \overset{R_2}{C^2} - \overset{R_3}{C^3} - CH$]".

Claim 9, line 20, replace "or" with -- of --.

Signed and Sealed this

Fifth Day of July, 1994

BRUCE LEHMAN

Attest:

Attesting Officer

Commissioner of Patents and Trademarks